(12) United States Patent
Hansen

(10) Patent No.: US 6,598,704 B2
(45) Date of Patent: Jul. 29, 2003

(54) TRUCK CATWALK SYSTEM

(76) Inventor: David A. Hansen, P.O. Box 111, Minto, ND (US) 58261

( * ) Notice: Subject to any disclaimer, the term of this patent is extended or adjusted under 35 U.S.C. 154(b) by 0 days.

(21) Appl. No.: 10/217,687

(22) Filed: Aug. 12, 2002

(65) Prior Publication Data

US 2002/0189503 A1 Dec. 19, 2002

Related U.S. Application Data

(63) Continuation-in-part of application No. 09/631,215, filed on Aug. 3, 2000, now Pat. No. 6,431,093.

(51) Int. Cl.[7] .................................................. E04G 1/16
(52) U.S. Cl. ........................ 182/113; 108/27; 108/134; 108/44; 296/3
(58) Field of Search ................. 182/113, 115, 182/127, 134, 53, 54, 56; 108/44, 27, 134, 135, 152; 296/3, 26.11, 26.15; 280/748, 760

(56) References Cited

U.S. PATENT DOCUMENTS

| | | | | | |
|---|---|---|---|---|---|
| 1,295,453 A | * | 2/1919 | Edland | ........................ | 182/55 |
| 2,184,457 A | * | 12/1939 | Kruse | ........................... | 182/55 |
| 2,849,257 A | * | 8/1958 | Woyton | ........................ | 182/55 |
| 2,957,541 A | * | 10/1960 | Everest et al. | .............. | 182/115 |
| 3,227,110 A | * | 1/1966 | Hamilton | ..................... | 108/134 |
| 4,029,355 A | * | 6/1977 | Wilhelmsen | ................. | 108/134 |
| 4,090,585 A | * | 5/1978 | Laub | ........................... | 182/113 |
| 6,012,545 A | * | 1/2000 | Faleide | ........................ | 182/127 |
| 6,431,093 B1 | * | 8/2002 | Hansen | ........................ | 108/135 |
| 6,494,291 B2 | * | 12/2002 | Ono | ............................. | 182/82 |

FOREIGN PATENT DOCUMENTS

NO  56115  * 1/1934

* cited by examiner

Primary Examiner—Lanna Mai
Assistant Examiner—Jerry A. Anderson

(57) ABSTRACT

A truck catwalk system for allowing an individual to easily access the interior of a truck box. The inventive device includes a pair of support brackets, at least one pivot bracket, a pair of chains attached to the support brackets, a catch mechanism pivotally attached to one of the support brackets, a platform pivotally attached to the support brackets and catchably engaged by the catch mechanism, a foldable rail structure attached to the platform, a handle attached to the platform, and a ladder attached to the platform and the truck box.

12 Claims, 14 Drawing Sheets

TRUCK CATWALK SYSTEM

CROSS-REFERENCE TO RELATED U.S. PATENT APPLICATION

I hereby claim benefit under Title 35, United States Code, Section 120 of U.S. patent application Ser. No. 09/631,215 filed Aug. 3, 2000, now U.S. Pat. No. 6,431,093. This application is a continuation-in-part application. The Ser. No. 09/631,215 application is currently pending and will officially issue into a patent on Aug. 13, 2002. The Ser. No. 09/631,215 application is hereby incorporated by reference into this application.

BACKGROUND OF THE INVENTION

1. Field of the Invention

The present invention relates generally to a catwalk system and more specifically it relates to a truck catwalk system for allowing an individual to easily access the interior of a truck box.

2. Description of the Prior Art

Devices for accessing the interior portions of a truck box have been in use for years. Typically, individuals operating a truck to access the interior portions of the truck box utilize a conventional ladder permanently attached to the truck box. These conventional ladders are generally comprised of a pair of vertical support members with a plurality of step members secured between the pair of vertical support members. The conventional ladder is further attached to the truck box by a number of support brackets that maintain the conventional ladder in the desired position. Alternatively, an operator of a truck may bring a conventional unattached ladder, which may be loosely retained, upon the truck box or within the truck.

The main problem with conventional ladder devices is that they cannot be repositioned about the truck box to allow the individual to access various portions of the truck box. Another problem with conventional ladders is the fact that they are not able to be folded and still maintain the required height and width requirements to travel down the road safely. Conventional ladders that are not secured to the truck box are extremely dangerous to utilize by an individual because of the significant risk of falling.

Examples of patented access devices include U.S. Pat. No. 3,601,220 to Saucier; U.S. Pat. No. 2,767,032 to Mitchell; U.S. Pat. No. 5,634,681 to Gionta; U.S. Pat. No. 5,799,962 to Barnhart; U.S. Pat. No. 4,371,056 to Anglade; U.S. Pat. No. 3,989,122 to Jenkins; U.S. Pat. No. 3,493,079 to Dudschus; U.S. Pat. No. 3,110,359 to Solomon, which are all illustrative of such prior art.

While these devices may be suitable for the particular purpose to which they address, they are not as suitable for checking the cargo of the box of the truck because the prior catwalks are to low to the ground, and without a safe way of getting from the ground to the catwalk. The previous inventions cannot be folded while maintaining the height and width restrictions for traveling down the road safely.

In these respects, the truck catwalk system according to the present invention substantially departs from the conventional concepts and designs of the prior art, and in so doing provides an apparatus primarily developed for the purpose of checking the cargo in the box of a truck system.

SUMMARY OF THE INVENTION

In view of the foregoing disadvantages inherent in the known types of catwalks now present in the prior art, the present invention provides a new truck catwalk system construction wherein the same can be utilized for checking the cargo in the box of a truck system.

The general purpose of the present invention, which will be described subsequently in greater detail, is to provide a new truck catwalk system that has many of the advantages of the ladder devices mentioned heretofore and many novel features that result in a new truck catwalk system which is not anticipated, rendered obvious, suggested, or even implied by any of the prior art ladder devices, either alone or in any combination thereof.

To attain this, the present invention generally comprises a pair of support brackets, at least one pivot bracket, a pair of chains attached to the support brackets, a catch mechanism pivotally attached to one of the support brackets, a platform pivotally attached to the support brackets and catchably engaged by the catch mechanism, a handle attached to the platform, a guard rail structure attached to the platform and a ladder attached to the platform and the truck box. The platform is comprised of a flat rectangular surface attached to the truck box by pivotal brackets. The support brackets are attached to the truck box to support the weight of the platform. The chains help to support the outer edge of the platform furthest from the box. The handle is utilized to lower and raise the platform. In an alternative embodiment, a pair of gears are attached to the handle and the platform wherein the gears are mechanically engaged with one another. The user manipulates the handle that rotates a first gear which rotates a second gear and the platform with respect to the truck box. The ladder is pivotally attached to the platform and the truck box.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a truck catwalk system that will overcome the shortcomings of the prior art devices.

A second object is to provide a truck catwalk system that allows the user to access the top of the box effectively and efficiently.

Another object is to provide a truck catwalk system that is comprised of a compact structure.

An additional object is to provide a truck catwalk system that allows the user to walk and check an entire side of the truck box at one time.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
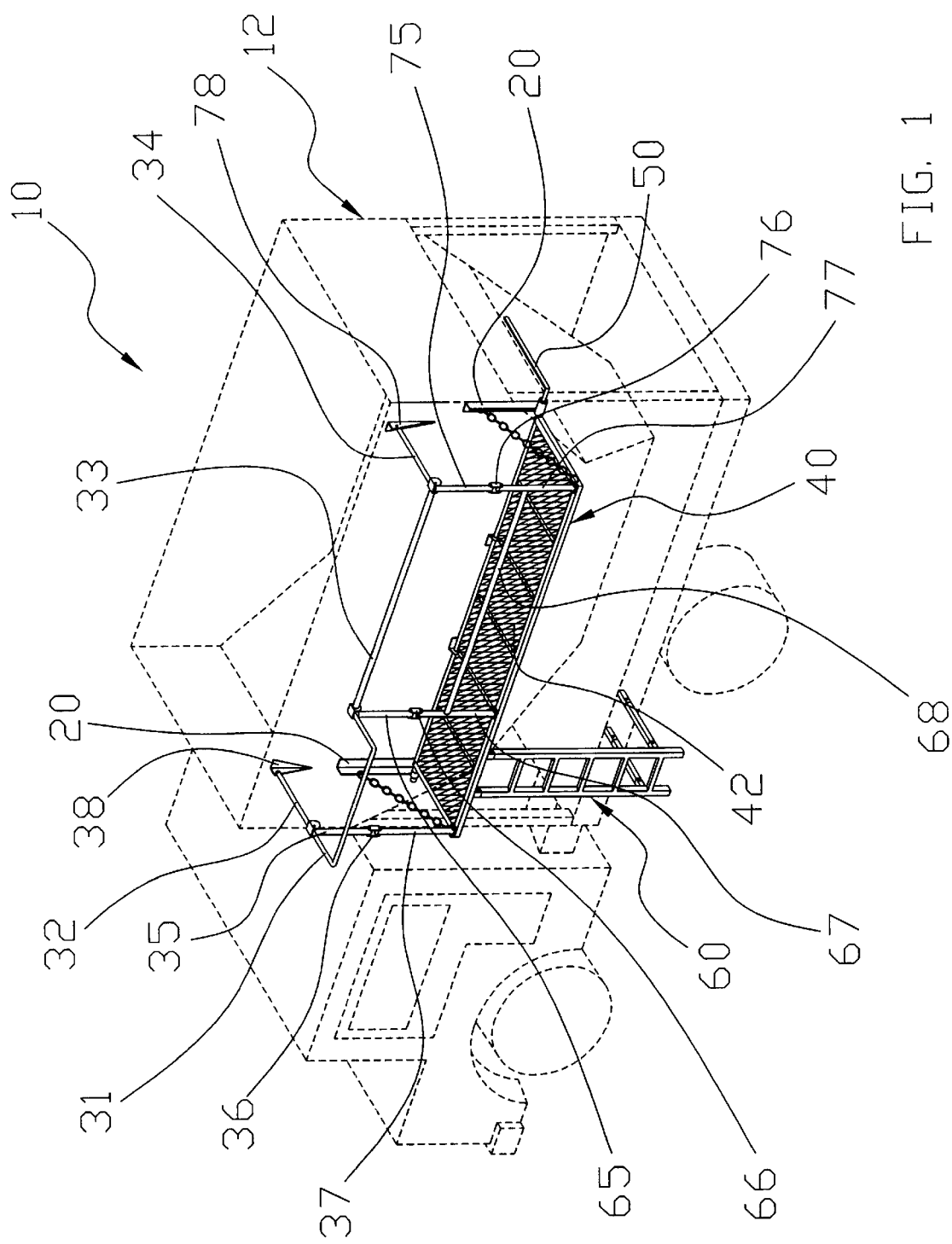
FIG. 1 is an upper perspective view of the present invention.

Turning now descriptively to the drawings, in which similar reference characters denote similar elements throughout the several views, FIGS. 1 through 8 illustrate a truck catwalk system 10, which comprises a pair of support brackets 20, at least one pivot bracket 22, a pair of chains 24 attached to the support brackets 20, a catch mechanism 30 pivotally attached to one of the support brackets 20, a platform 40 pivotally attached to the support brackets 20 and catchably engaged by the catch mechanism 30, a guard rail structure extending upwardly from the platform, a handle 50 attached to the platform 40, and a ladder 60 attached to the platform 40 and the truck box 12.

The platform 40 is comprised of a flat rectangular surface attached to the truck box 12 by pivot brackets as best shown in FIG. 1 of the drawings. A support shaft 44 is attached to the inner portion of the platform 40 for pivotally attaching the platform 40 to the truck box 12. A mesh 42 preferably extends between the perimeters of the platform 40 to support an individual walking upon the platform 40 though a solid structure may also be utilized. It can be appreciated that the platform 40 may be comprised of various shapes and structures.

Figure 2:
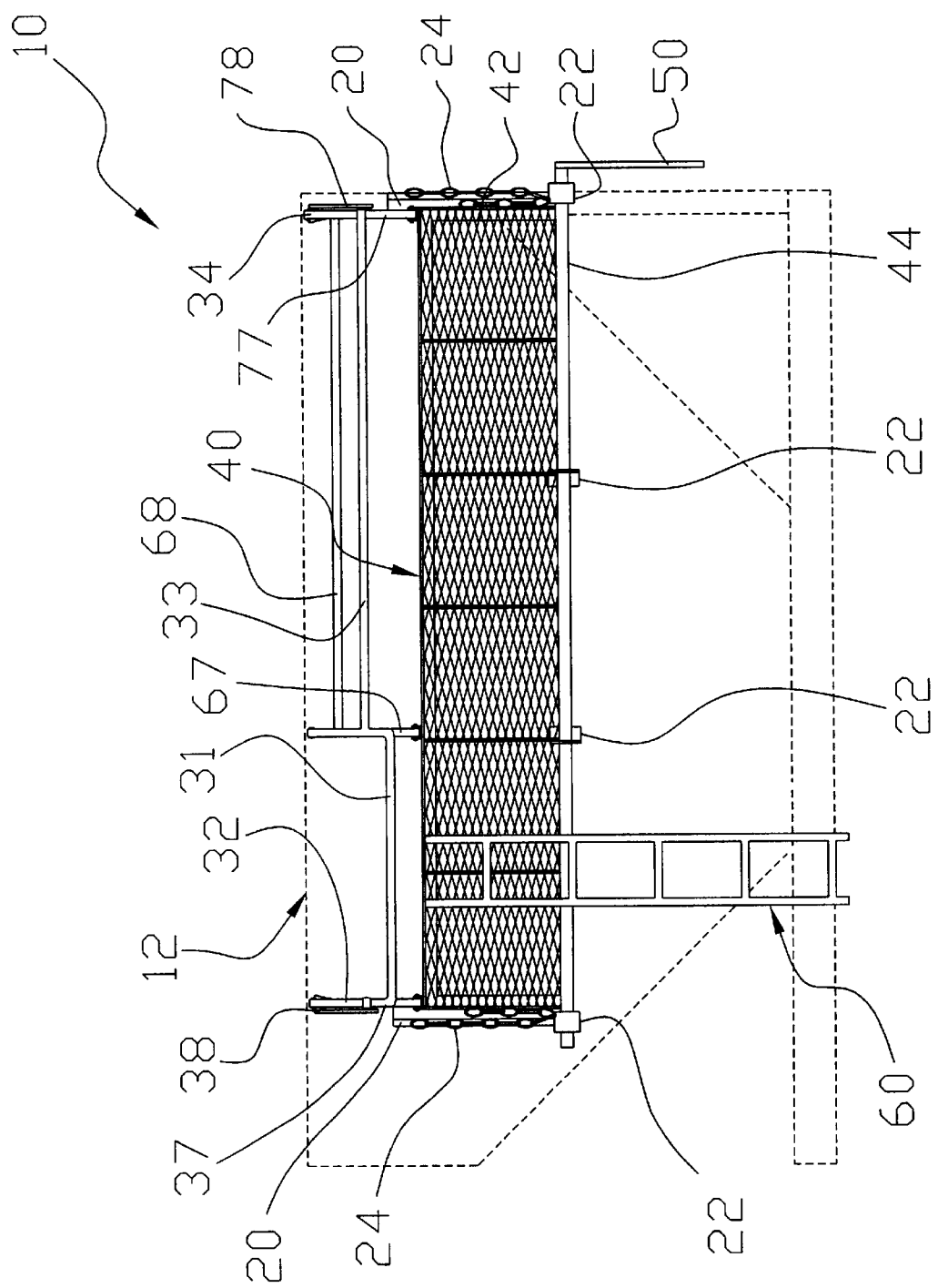
FIG. 2 is a side view of the present invention showing the catwalk in the storage position.
Figure 3:
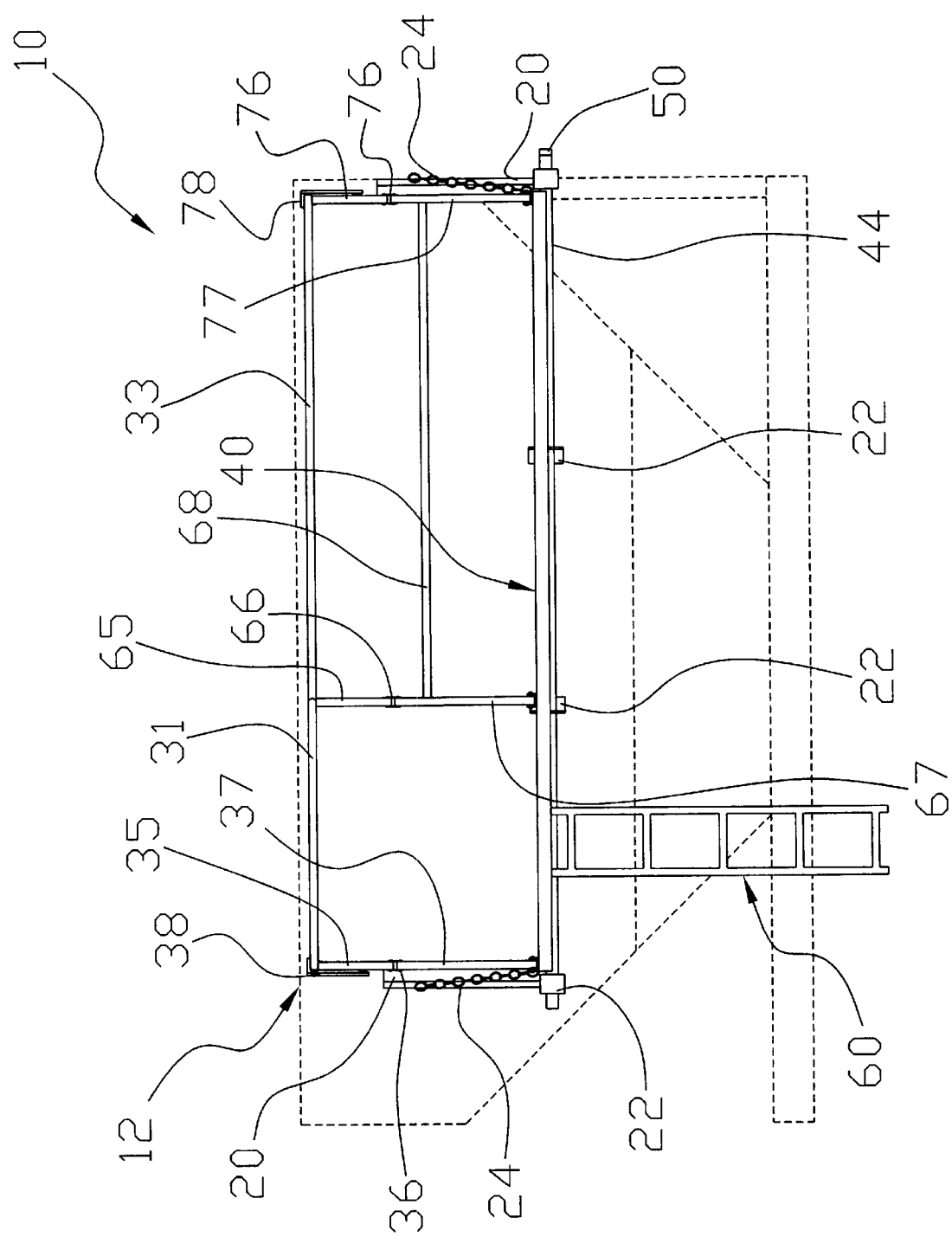
FIG. 3 is a side view of the present invention showing the catwalk in the extended position.

As best shown in FIGS. 1 and 2 of the drawings, one or more support brackets 20 are attached to the truck box 12 to support the weight of the platform 40. The support brackets 20 are preferably attached vertically upon the outer side wall of the truck box 12 by a conventional securing means such as but not limited to fasteners or welding. The support brackets 20 may be constructed of any rigid structure such as angle iron.

One or more pivot brackets 22 are attached to the support brackets 20 and/or to the truck box 12 for pivotally receiving the support shaft 44 of the platform 40. The pivot brackets 22 may be constructed of any well-known structure for rotatably retaining a structure.

Figure 4:
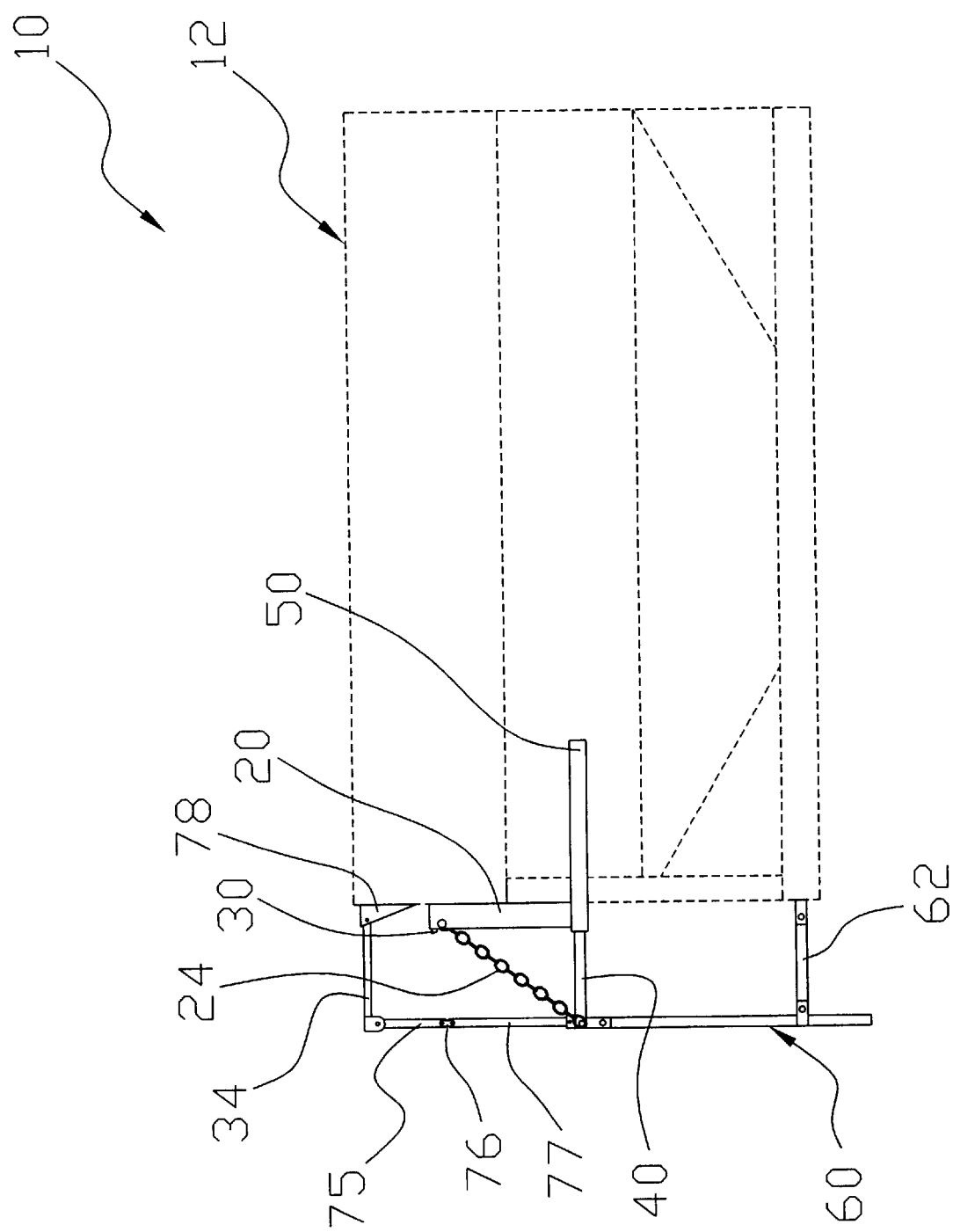
FIG. 4 is a rear view of the present invention showing the catwalk in the extended position.

As best shown in FIGS. 1 through 4 of the drawings, one or more chains 24 are attached to the support brackets 20 and to the outer portions of the platform 40 opposite of the support shaft 44 to support the platform 40 in a horizontal position when fully extended. As best shown in FIG. 4 of the drawings, the chains 24 support the outer portion of the platform 40 when fully extended in a horizontal position including the weight of an individual positioned upon the platform 40. It can be appreciated that rope, cable, cord or other structures may be utilized in place of the chain to support the platform 40 when in the extended position.

Figure 5:
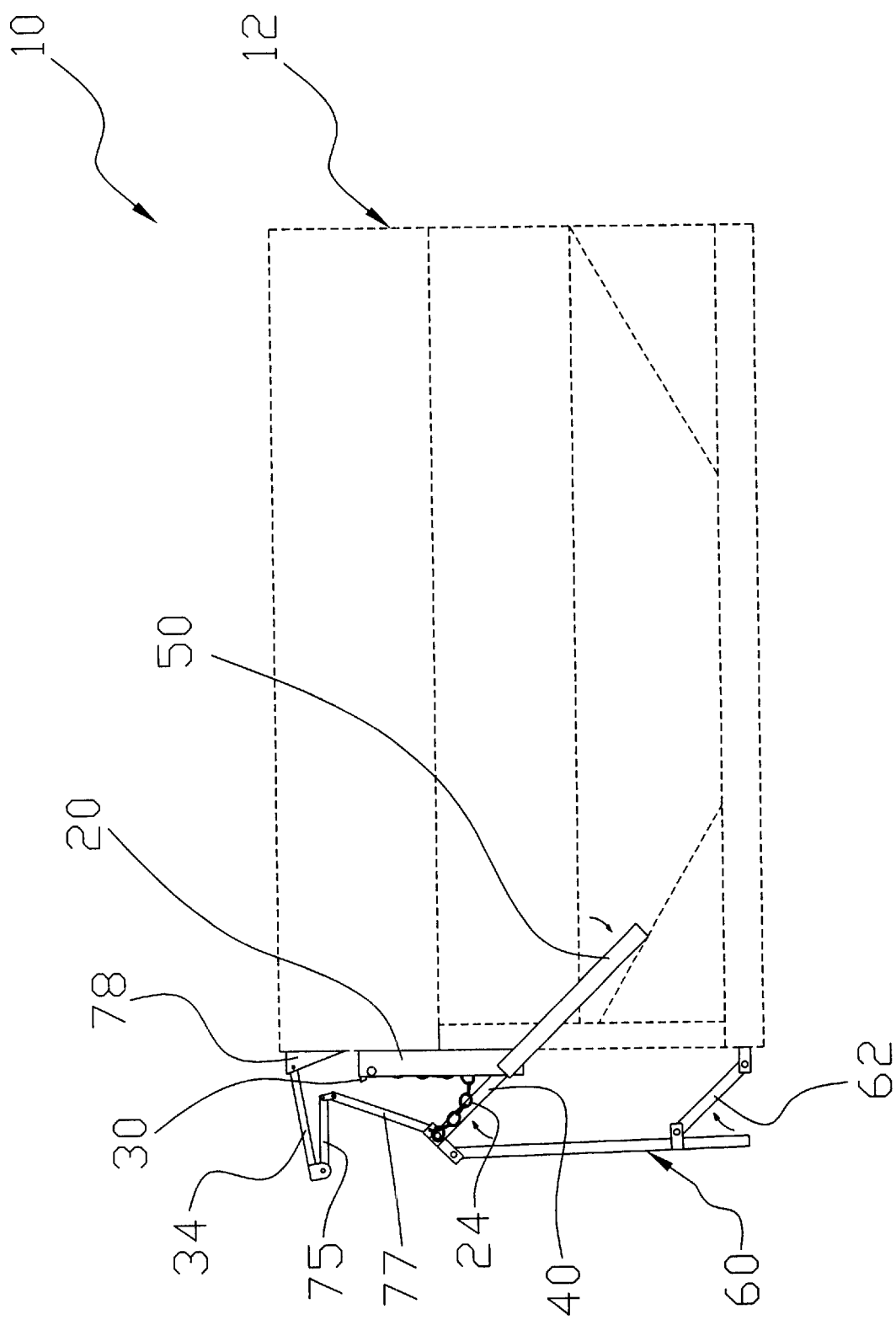
FIG. 5 is a rear view of the present invention showing the catwalk being manipulated into the storage position.

As shown in FIG. 5 of the drawings, the handle 50 is utilized to lower and raise the platform 40 by an individual physically manipulating the distal portion of the handle 50. As best shown in FIG. 4 of the drawings, the handle 50 is nonmovably attached to the platform 40 such as to the support shaft 44 or to the end portion of the platform 40. The handle 50 is an elongated rigid structure that is easy to grasp by an individual. The handle 50 is preferably parallel to the plane of the platform 40 as further shown in FIG. 4 of the drawings.

Figure 6:
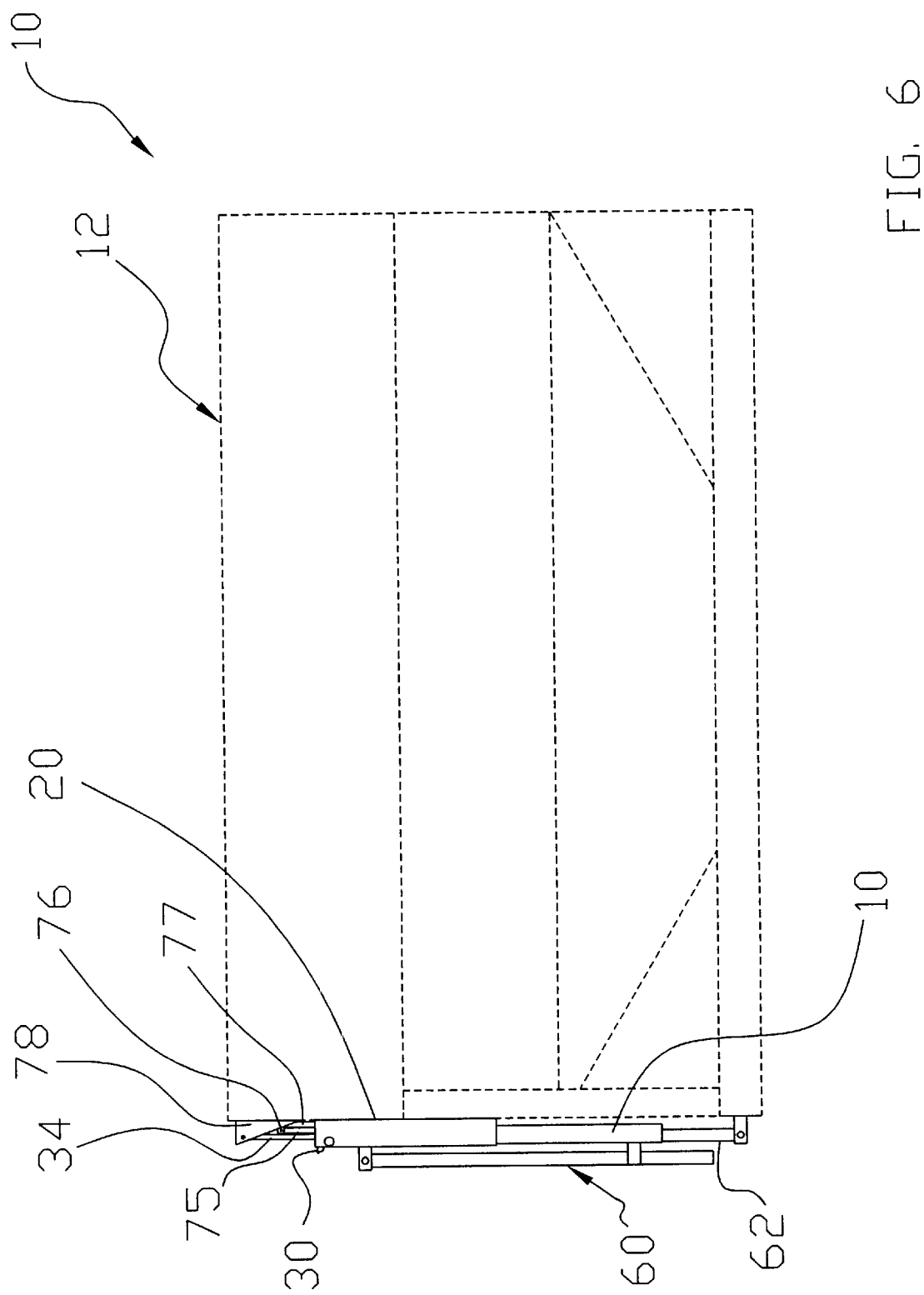
FIG. 6 is a rear view of the present invention showing the catwalk in the storage position.
Figure 7:
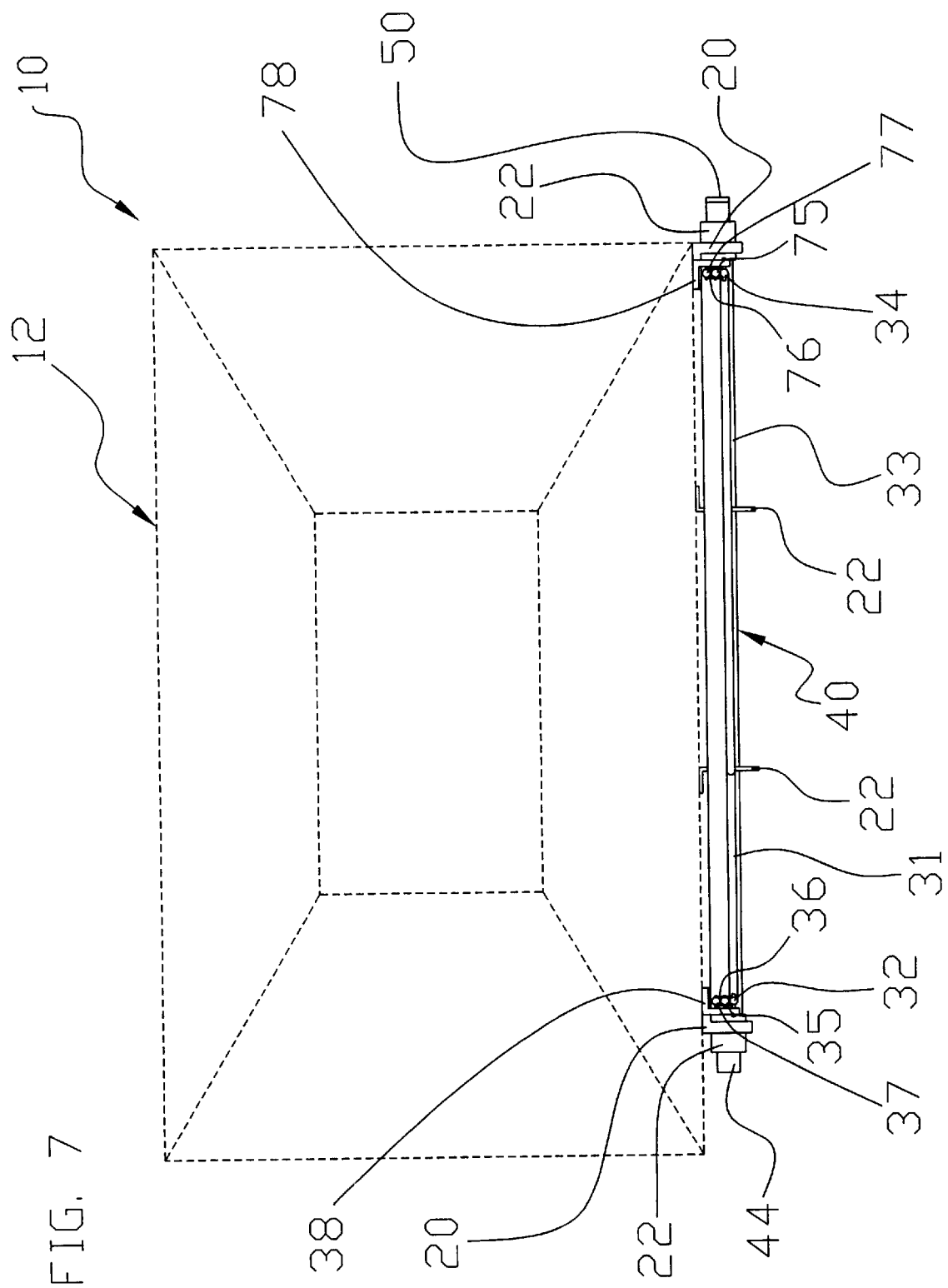
FIG. 7 is a top view of the present invention showing the catwalk in the storage position.
Figure 8:
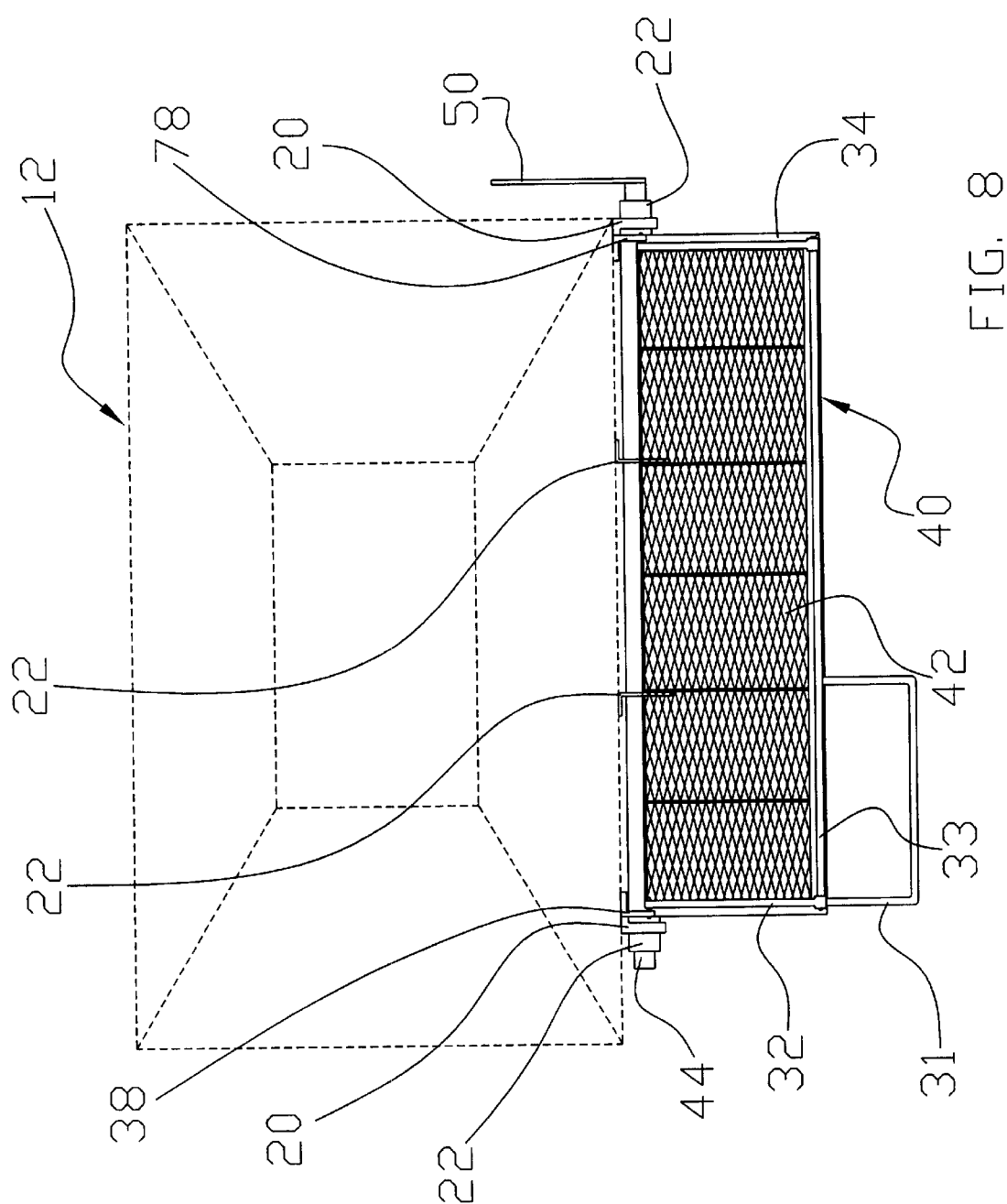
FIG. 8 is a top view of the present invention showing the catwalk in the extended position.
Figure 9:
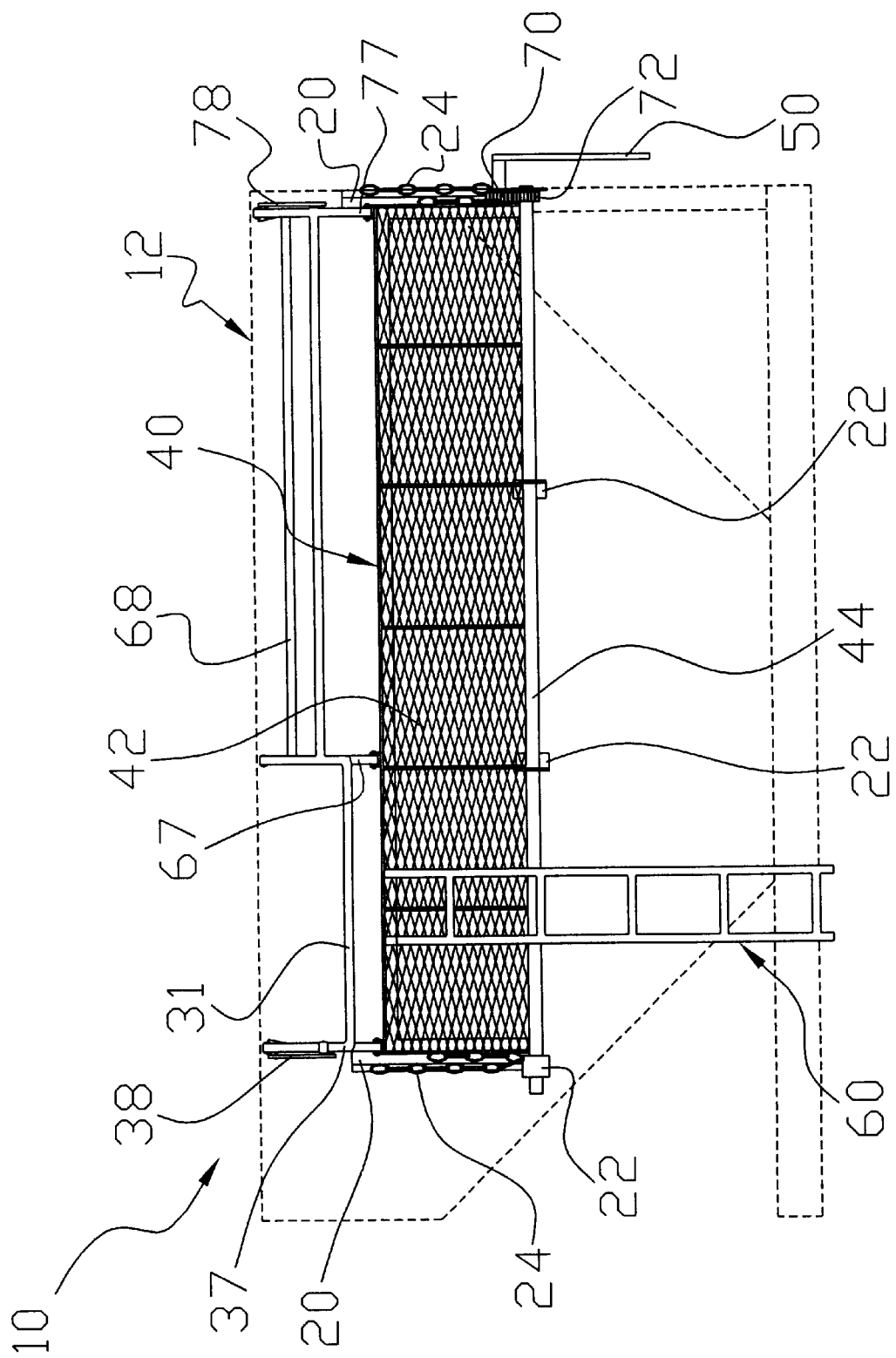
FIG. 9 is a side view of an alternative embodiment of the present invention disclosing a first gear and a second gear.
Figure 10:
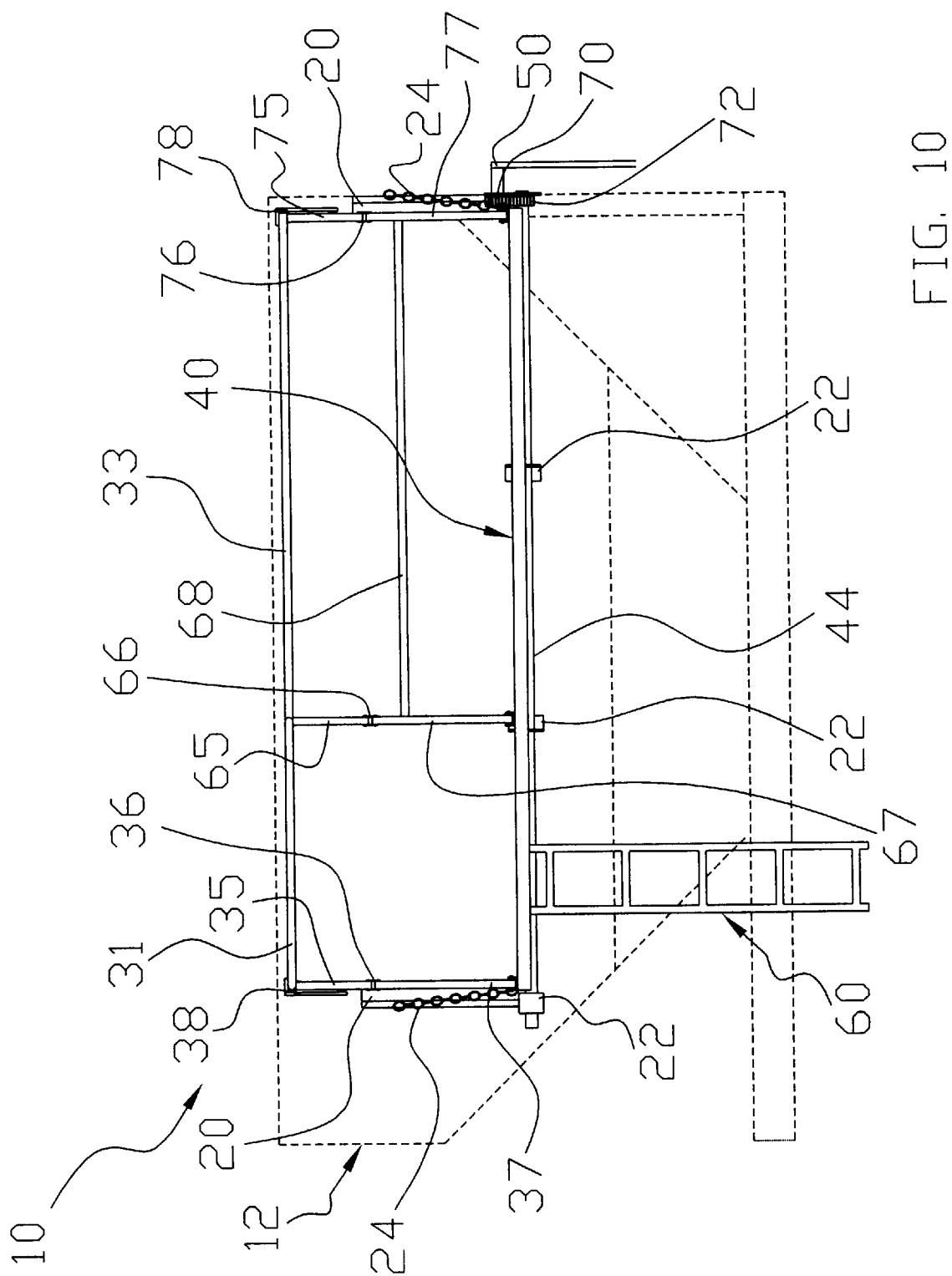
FIG. 10 is a side view of the alternative embodiment showing the catwalk in the extended position.
Figure 11:
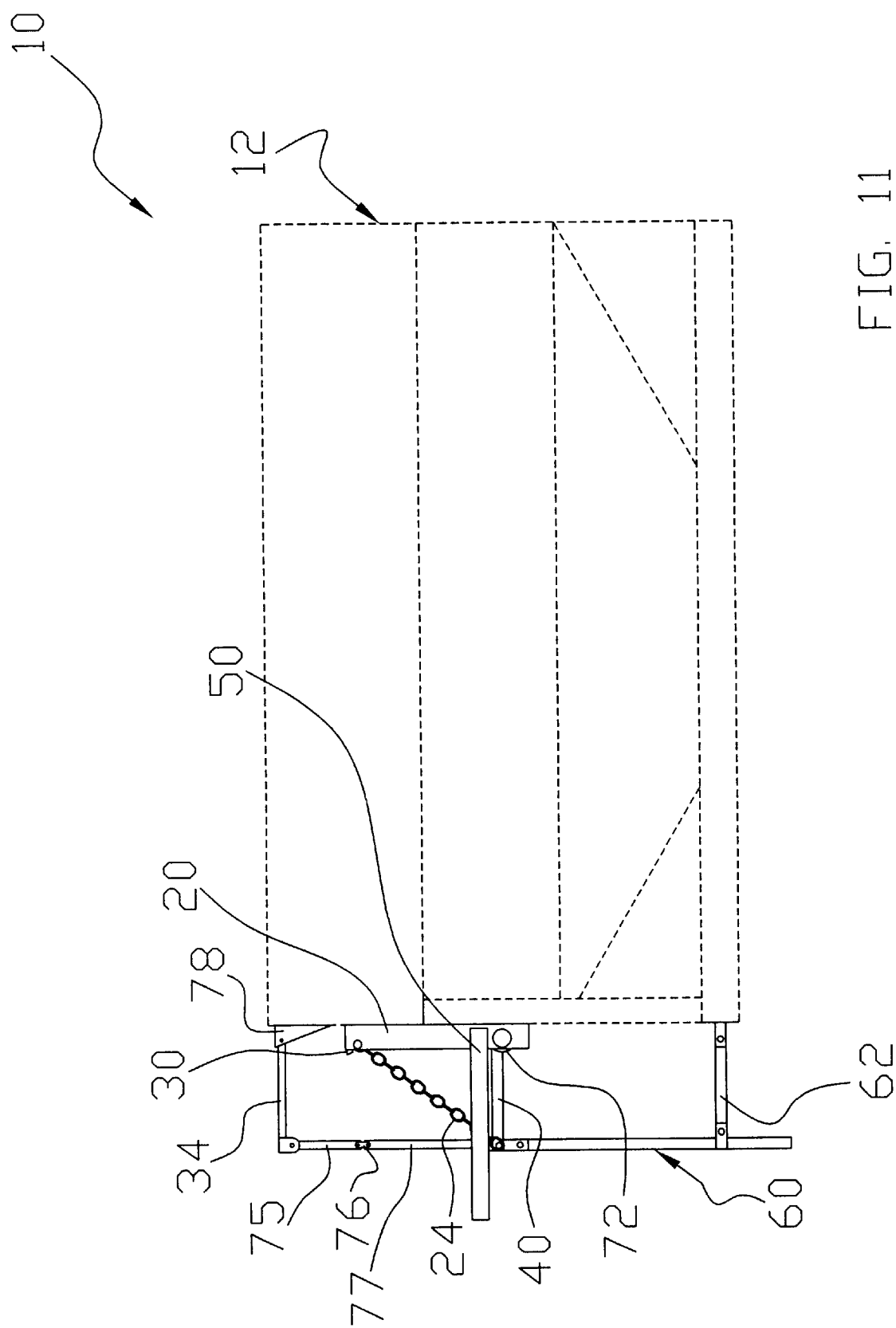
FIG. 11 is a rear view of the alternative embodiment showing the catwalk in the extended position.

As shown in FIGS. 4 through 6 of the drawings, the catch mechanism 30 is pivotally attached to one of the support brackets 20 for selectively engaging the platform 40 when in the storage position. The catch mechanism 30 is preferably constructed of a hook structure that is pivoted downwardly upon the platform 40 when in a vertical position adjacent the side of the truck box 12. The catch mechanism 30 may be constructed of various structures designed for engaging the platform 40 when in the storage position. A spring or similar device is utilized between the catch mechanism 30 and the support bracket 20 to apply a downward force upon the catch mechanism 30 to prevent accidental removal of the catch mechanism 30 while retaining the platform 40 in a storage position.

As best shown in FIG. 5 of the drawings, the ladder 60 is pivotally attached to the outer portion of the platform 40 and the truck box 12. The ladder 60 is generally comprised of two vertical orientated braces and a plurality of horizontal braces. One or more support arms 62 are pivotally attached between the ladder 60 and the truck box 12 as shown in FIGS. 4 through 6 of the drawings. The support arms 62 fold with the platform 40 to stay with in a safe width during driving conditions as shown in FIG. 5 of the drawings.

As shown in FIG. 1 of the drawings, a first lower member 37 and a second lower member 77 are pivotally attached to outer corners of the platform 40. The first lower member 37 and the second lower member 77 extend upwardly and substantially transversely from the platform when in the platform 40 is positioned down as shown in FIG. 1 of the drawings. The first lower member 37 and the second lower member 77 extend upwardly and parallel to the platform when in the platform 40 is positioned in a storage position as shown in FIG. 6 of the drawings.

As shown in FIG. 1 of the drawings, a first upper member 35 is pivotally attached to the first lower member 37 by a first hinge 36. As shown in FIG. 1 of the drawings, a second upper member 75 is pivotally attached to the second lower member 77 by a first hinge 76. A front rail 33 is pivotally attached between the upper ends of the first upper member 35 and the second upper member 75 as further shown in FIG. 1 of the drawings.

As shown in FIGS. 1 and 2 of the drawings, a first bracket 38 and a second bracket 78 is attachable to the side of the truck box 12. A first rail 32 and a second rail 34 are pivotally attached to the first bracket 38 and the second bracket 78 extending outwardly from the truck box 12. The distal ends of first rail 32 and the second rail 34 are attached to the front rail 33 forming a solid U-shaped structure which the first upper member 35 and the second upper member 75 are pivotally connected to.

In an alternative embodiment shown in FIGS. 9 through 14 of the drawings, a first gear 70 is attached to the handle 50, and a second gear 72 is attached to the platform 40 or support shaft 44 wherein the gears 70, 72 are mechanically engaged with one another. The user manipulates the handle 50 which rotates a first gear 70 which rotates a second gear 72 and the platform 40 with respect to the truck box 12.

In use, the platform 40 is lowered by releasing the catch mechanism 30 from the platform 40. Once the catch mechanism 30 is released from the platform 40, the user then rotates the handle 50 upwardly causing the platform 40 to extend outwardly from the truck box 12. As the individual manipulates the handle 50, the platform 40, the ladder 60 and guide rail structure start to unfold. As the platform 40 is unfolding, the support arms 62 on the ladder 60 are unfolded to the horizontal position as best shown in FIG. 4 of the drawings. When the platform 40 is in a horizontal position the ladder 60 is in a substantially vertical position and the guide rail structure is fully extended forming a cage structure for when an individual stands upon the platform 40. The chains 24 are taut carrying a portion of the weight of the platform 40 while the support arms 62 are in the horizontal position as shown in FIG. 4 of the drawings. To close the platform 40 into a storage position, the user rotates the handle 50 downwardly until the platform 40 is in the vertical position as shown in FIG. 6 of the drawings. When the platform 40 is substantially vertically orientated, the user manipulates the catch mechanism 30 upon the platform 40 to prevent the platform 40 from accidentally extending horizontally. With this the chains 24 are loose, the ladder 60 and the support arms 62 are in the vertical position substantially parallel to the ladder 60.

Figure 12:
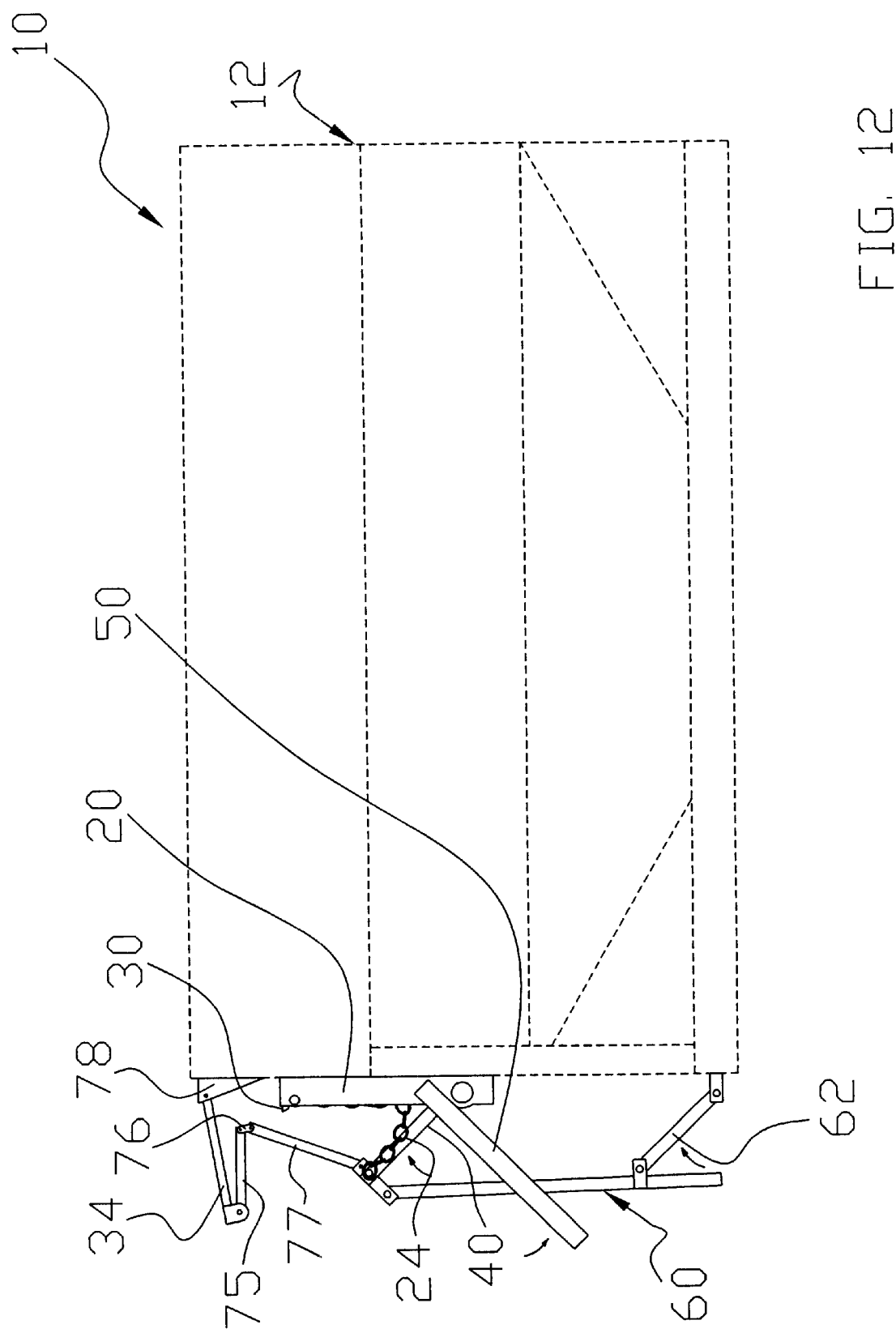
FIG. 12 is a rear view of the alternative embodiment showing the catwalk in the half way folded position.
Figure 13:
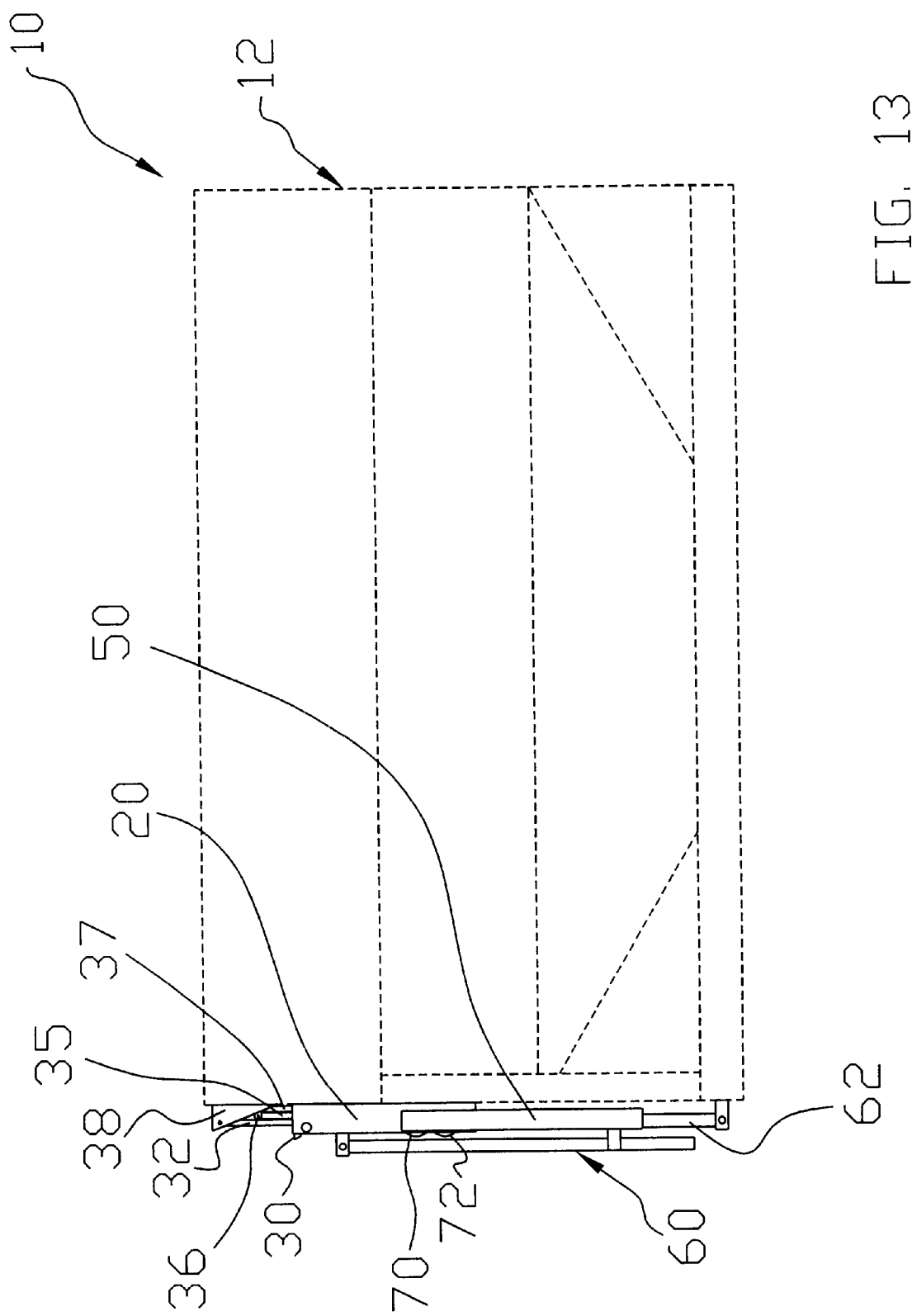
FIG. 13 is a rear view of the alternative embodiment showing the catwalk in the closed or folded position.
Figure 14:
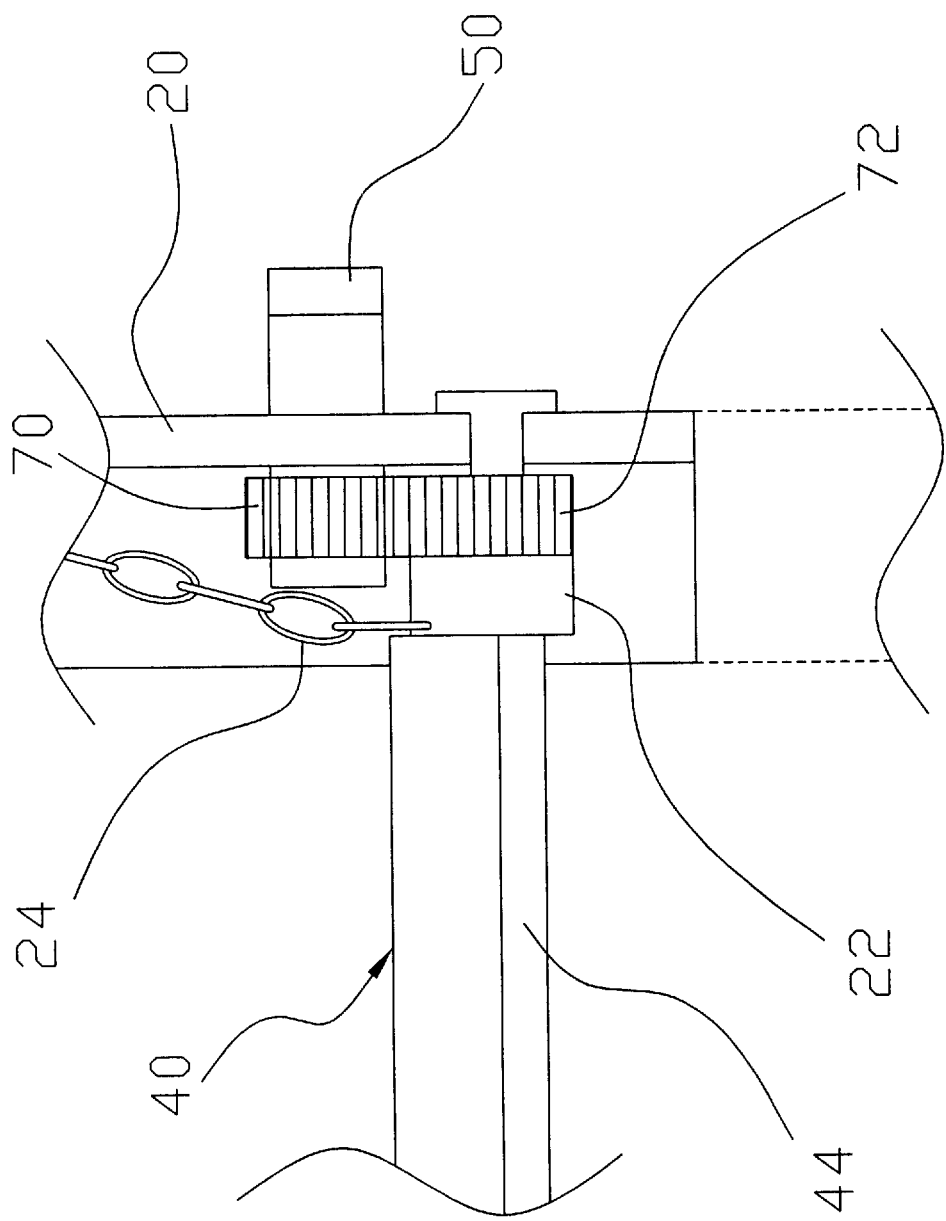
FIG. 14 is a magnified view of the gear movement system used to lower or raise the platform within the alternative embodiment.

With the alternative embodiment shown in FIGS. 9 through 14, the movements of the components are substantially the same. To extend the platform 40 into a horizontal position, the handle 50 is rotated upwardly causing the first gear 70 to rotate the second gear 72 in an opposite rotational direction. As shown in FIG. 12 of the drawings, when the individual desires to fold the platform 40 upon the truck box 12 into the storage position the handle 50 is manipulated in a direction opposite of that utilized to extend the platform. Once the platform 40 is in the vertical storage position, the catch mechanism 30 is positioned about the platform 40 to retain the platform 40 in the desired position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A truck catwalk system for attaching to a truck box for allowing access to an interior of said truck box from various position, comprising:
    a plurality of support brackets attachable to said truck box;
    a platform pivotally attached to said plurality of support brackets, wherein said platform has a storage position and an extended position;
    a guard rail structure attached to said platform, wherein said guard rail structure includes a first lower member and a second lower member pivotally attached to said platform, a first upper member and a second upper member pivotally attached to said first lower member and said second lower member respectively, and an upper U-shape rail structure pivotally attachable to said truck box and pivotally attached to said first upper member and said second upper member;
    a catch means for selectively retaining said platform in said storage position; and
    a handle attached to said platform for allowing an individual to manipulate said platform between said storage position and said extended position.

2. The truck catwalk system of claim 1, including at least one elongated flexible member attached to one of said plurality of support brackets and to said platform for supporting said platform in said extended position.

3. The truck catwalk system of claim 2, wherein said at least one elongated flexible member is comprised of a length of chain.

4. The truck catwalk system of claim 1, wherein said catch means is comprised of a catch mechanism pivotally attached to one of said plurality of support brackets.

5. The truck catwalk system of claim 4, wherein said catch mechanism is comprised of a hook structure.

6. The truck catwalk system of claim 1, wherein said platform is a flat structure.

7. The truck catwalk system of claim 1, wherein said platform includes a support shaft rotatably positioned within a plurality of pivot brackets.

8. The truck catwalk system of claim 1, wherein said platform is rectangular shaped.

9. The truck catwalk system of claim 1, wherein said platform includes a plurality of apertures.

10. The truck catwalk system of claim 1, including a ladder attached to said platform.

11. A truck catwalk system for attaching to a truck box for allowing access to an interior of said truck box from various position, comprising:

a plurality of support brackets attachable to said truck box;

a platform having an inner edge and an outer edge wherein said inner edge is pivotally attached to said plurality of support brackets, and wherein said platform has a storage position and an extended position;

a guard rail structure attached to said platform, wherein said guard rail structure includes a first lower member and a second lower member pivotally attached to said platform, a first upper member and a second upper member pivotally attached to said first lower member and said second lower member respectively, and an upper U-shape rail structure pivotally attachable to said truck box and pivotally attached to said first upper member and said second upper member;

a first gear rotatably attached to one of said plurality of support brackets adjacent said platform;

a second gear attached to said platform about a pivot axis of said platform, wherein said second gear is mechanically engaged to said first gear;

a catch means for selectively retaining said platform in said storage position;

a handle attached to said first gear for allowing an individual to manipulate said platform between said storage position and said extended position; and a ladder pivotally attached to said outer edge of said platform.

12. A truck catwalk system for attaching to a truck box for allowing access to an interior of said truck box from various position, comprising:

a platform pivotally attachable to said truck box, wherein said platform has a storage position and an extended position; and a guard rail structure attached to said platform, wherein said guard rail structure includes a first lower member and a second lower member pivotally attached to said platform, a first upper member and a second upper member pivotally attached to said first lower member and said second lower member respectively, and an upper U-shape rail structure pivotally attachable to said truck box and pivotally attached to said first upper member and said second upper member.

* * * * *